(12) United States Patent
Flynn

(10) Patent No.: US 9,872,579 B2
(45) Date of Patent: Jan. 23, 2018

(54) STORAGE DEVICE FOR APPAREL BELTS AND LINEAR SHAPED ACCESSORY ITEMS

(71) Applicant: Edward Michael Flynn, Westborough, MA (US)

(72) Inventor: Edward Michael Flynn, Westborough, MA (US)

( * ) Notice: Subject to any disclaimer, the term of this patent is extended or adjusted under 35 U.S.C. 154(b) by 0 days.

(21) Appl. No.: 14/967,197

(22) Filed: Dec. 11, 2015

(65) Prior Publication Data

US 2017/0164771 A1    Jun. 15, 2017

(51) Int. Cl.
*A47G 25/74* (2006.01)
*F16B 45/02* (2006.01)

(52) U.S. Cl.
CPC ............ *A47G 25/743* (2013.01); *F16B 45/02* (2013.01)

(58) Field of Classification Search
CPC .......... A47F 7/024; A47F 5/0006; A47F 7/00; A47F 7/005; A47G 25/74; A47G 25/743; A47G 25/746; A47G 25/24
USPC ..... 206/391, 389; 211/85.5, 85.3, 85.2, 113, 211/106.01, 119.1, 119.15, 116, 115; 223/106; 242/381.4, 388, 388.6, 378.4, 242/385.4
See application file for complete search history.

(56) References Cited

U.S. PATENT DOCUMENTS

| | | | | |
|---|---|---|---|---|
| 67,459 A * | 8/1867 | Starritt | ....................... | 242/378.4 |
| 975,811 A * | 11/1910 | Walsh | ..................... | D06F 53/04 |
| | | | | 211/119.1 |
| 1,979,627 A * | 11/1934 | Kozak | .................... | B65H 75/38 |
| | | | | 211/119.1 |
| 2,206,174 A * | 7/1940 | Falk | ...................... | D06F 53/045 |
| | | | | 211/119.1 |
| 3,477,660 A * | 11/1969 | Abraham | .............. | D06F 53/045 |
| | | | | 211/119.03 |
| 4,120,401 A * | 10/1978 | Newman | ................ | A45C 11/16 |
| | | | | 206/566 |
| 4,483,330 A * | 11/1984 | Jacobsen | .............. | A63B 21/015 |
| | | | | 242/378.4 |
| 4,709,838 A | 12/1987 | Campbell | | |
| 4,809,635 A * | 3/1989 | Essig | ..................... | B63B 21/00 |
| | | | | 114/230.23 |
| 4,863,043 A | 9/1989 | Bowen | | |
| 4,970,882 A * | 11/1990 | Arrendondo | ........ | E05B 73/0011 |
| | | | | 242/378.4 |
| 5,054,666 A | 10/1991 | Blanchard | | |
| D334,291 S | 3/1993 | Rooke | | |

(Continued)

*Primary Examiner* — Daniel J Troy
*Assistant Examiner* — Hiwot Tefera
(74) *Attorney, Agent, or Firm* — Chapin IP Law, LLC

(57) ABSTRACT

A storage device that hangs from a rod, rope, cable or other support member which employs tension force to hold apparel belts with prongs and buckles, or other linear items that have holding elements (rings, buckles, fabric loops or holes), to the surface of a hollow body which rotates around the shaft of the hanging hook. This is done by latching the belts or linear items to the device using eyelets, clasps, clips or closeable hooks (e.g. carabiner spring hooks or reversible wire gates or closeable rings). This device stores linear items in a space-efficient way when a plurality of items attached are hung, allows better organizing and viewing of the items stored, even in a crowded space. In addition it securely attaches the items stored to the attachment mechanism and allows retrieval of items easily without the need to remove the whole device from the support member.

15 Claims, 7 Drawing Sheets

(56) References Cited

U.S. PATENT DOCUMENTS

| | | | | |
|---|---|---|---|---|
| 5,358,348 A | * | 10/1994 | Kennedy | B43K 23/002 211/69.1 |
| 5,437,378 A | * | 8/1995 | Ta | A47G 25/743 211/115 |
| 5,526,968 A | | 6/1996 | Larson | |
| 5,642,817 A | * | 7/1997 | O'Brien | A47G 25/746 211/60.1 |
| 5,642,841 A | | 7/1997 | Beaty | |
| 5,664,708 A | | 9/1997 | Sacks | |
| 5,685,436 A | * | 11/1997 | Davet | A47F 7/024 211/163 |
| 5,799,843 A | * | 9/1998 | Hsu | A47G 25/743 223/85 |
| D404,577 S | | 1/1999 | Schildkraut | |
| 5,913,479 A | * | 6/1999 | Westwood, III | B66C 1/36 24/298 |
| 6,076,714 A | | 6/2000 | Wyenn | |
| D432,319 S | | 10/2000 | Bartholow | |
| 6,206,209 B1 | | 3/2001 | Houg-Brown | |
| 6,264,046 B1 | | 7/2001 | Ford | |
| 6,296,160 B1 | | 10/2001 | Murray | |
| 6,398,086 B1 | | 6/2002 | Bennett | |
| 6,478,168 B1 | * | 11/2002 | McNamee | A47F 7/12 211/115 |
| 6,497,347 B1 | | 12/2002 | Feibelman et al. | |
| 6,749,093 B2 | | 6/2004 | Harris | |
| 7,040,517 B1 | | 5/2006 | Swanson | |
| 7,207,296 B2 | * | 4/2007 | DiDonato | A01K 27/004 119/794 |
| 8,292,097 B2 | * | 10/2012 | Goldberg | A47F 7/024 206/560 |
| 8,967,066 B1 | * | 3/2015 | Bekey | B63B 21/00 114/230.23 |
| 2009/0294390 A1 | * | 12/2009 | Weshler | A47F 7/024 211/119.003 |
| 2010/0072314 A1 | * | 3/2010 | Sherman | D06F 53/045 242/388.91 |
| 2013/0264300 A1 | * | 10/2013 | Shaffer | A47F 5/0006 211/117 |
| 2015/0094171 A1 | * | 4/2015 | Niskanen | A63B 69/0026 473/446 |

* cited by examiner

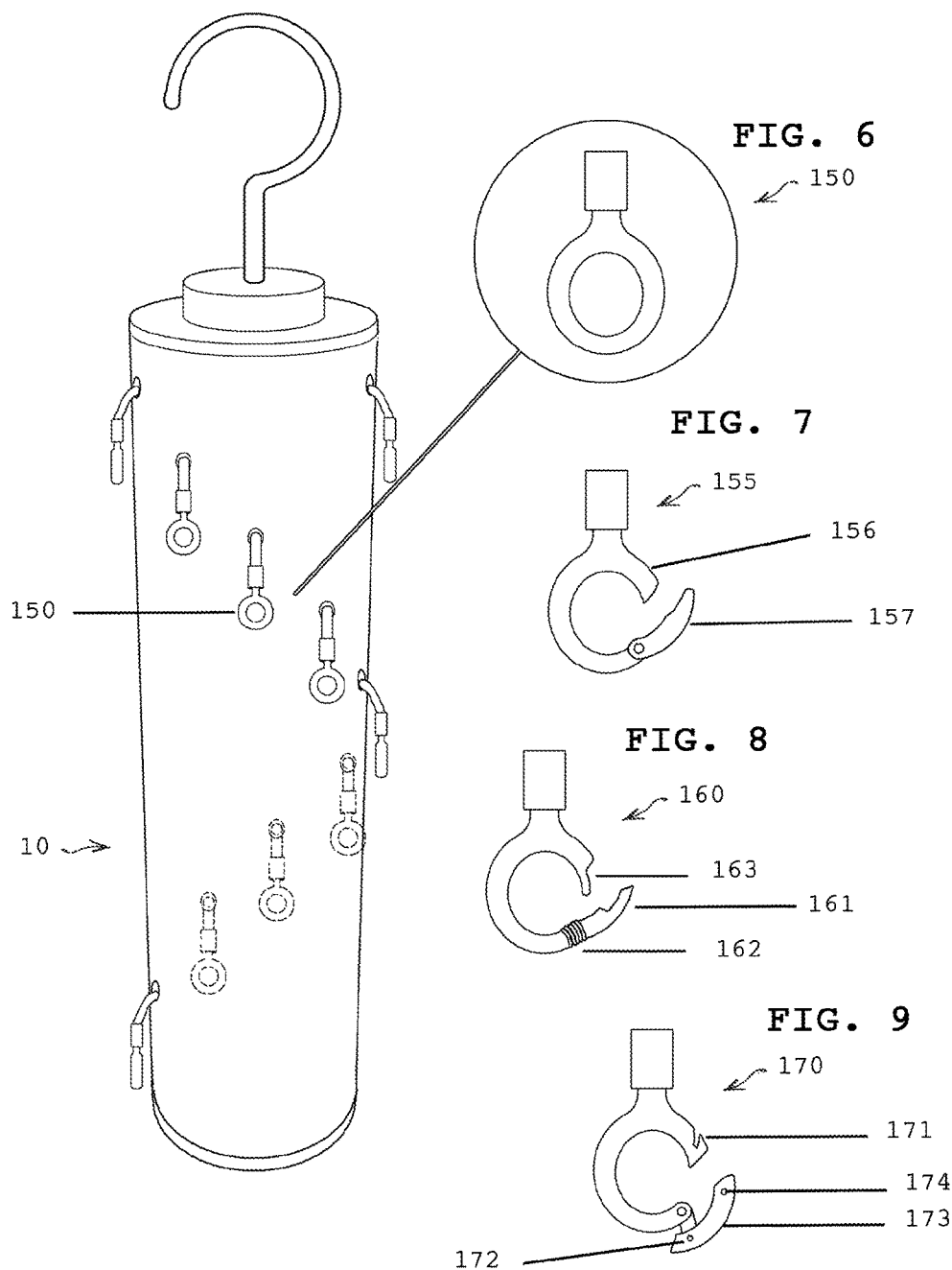

STORAGE DEVICE FOR APPAREL BELTS AND LINEAR SHAPED ACCESSORY ITEMS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention pertains to the organization and storage of belts used with clothing, specifically belts which use fastening buckles. A review of prior art in the apparel accessory group shows a general split on patents into two categories, one focused on the commercial display of belt items in retail sales, and another focused on the end consumer for use in a residential closet. The purpose of the former category is generally to protect the items from damage before sale, enhance displays, coordinate belts with other clothing items, or provide security against theft. U.S. Pat. No. 5,799,843 [1998—Hsu], U.S. Pat. No. 6,264,046 [2001—Ford], U.S. Pat. No. 5,054,666 [1991—Blanchard] and U.S. Pat. No. 6,497,347 [2002—Feibelman] are examples of designs made for these uses. This category of belt hangers is not practical for consumers to store in their personal closets as they require special parts and a good amount of attachment/detachment time.

Several subset types of holders or hangers exist for holding long linear accessories like belts in a residential closet. A large subset of these is basically the standard three sided garment hanger modified by the addition of clips, prongs or slots. U.S. Pat. No. 6,749,093 B2 [2004—Harris], U.S. Pat. No. 6,296,160 [2001—Murray], and D432319 [2000—Bartholow] are examples. These subset types offer space efficiency but due to their perpendicular orientation to the support member, and the tendency to orient the thin side of the belt to the user, visibility to the items stored on them can become an issue in a tightly packed closet. The hanger may also be subject to tilt due to uneven weight distribution with several belts stored on it, which can result in dropped belts. The belts may also be dislodged from the hooks or slots when bumped or when adjacent articles are lifted out of the closet.

Another subset of designs has a focus on a valet hanger. Besides holding a suit, ties and belts can be secured with clips to make up a coordinated set of clothing for storage or travel. One such example is U.S. Pat. No. 5,526,968 [1996—Larson]. These types have the limitation of visually obscuring the belts by the larger clothing items placed over the hanger when placed in a crowded closet. The number of belts, which may be attached, is usually limited.

Another subset of patents in the residential category exists, which upon examination, are designs primarily for tie storage with a claimed secondary use for belts as well. Examples are U.S. Pat. No. 5,642,841 [1997—Beaty], U.S. Pat. No. 4,863,043 [1989—Bowen] and U.S. Pat. No. 6,398,086 [2002—Bennet]. The inadequacies of the combined tie/belt storage stem from the fact that they rely on gravity to secure the belt frame to a cantilevered horizontal facing surface. Since most ties are quite flexible and sit limply on the surface, gravity is sufficient for ties but does not serve as well for many belts, especially so with rigid belts. When the cantilevered surface is used to hold the belt frame, the rigid buckles nest awkwardly in the assembly. As the buckles are not securely fastened to the holding surface the buckle can be knocked off the holder. Visibility and removal are difficult in a normally crowded closet. The storage device often has to be removed off the rod to fully see the items. The mere removal of the hanger can subject the belt frames to be dislodged.

Attempts have been made to solve these problems. U.S. Pat. No. 5,664,708 [1997—Sacks], for example, has the ability to rotate, improving visibility; but reliance on a cantilevered surface still subjects stored items to imbalance and dislodgement. U.S. D404577 [1999—Schildkraut] reduces dislodgement risk by use of deeper article attachment hooks and offers visibility with rotation capability. However, this is still problematic to the user when he needs to remove and hold several belts because the desired belt is located on the lower section of the deep storage hooks.

In paragraphs two, three and five of U.S. Pat. No. 5,642,817 [1997—O'Brien], the arguments for the requirements and limitations of previous attempts to construct a device for hanging belts are captured. In U.S. Pat. No. 5,642,817 design, O'Brien attempts to resolve the problems of hanger tilt under load with an arcuate shape and rounded corners of the hanger. It proposes to solve the above-mentioned problem of dropped items by use of firm attachment of the device to a ring. It proposes the belt separation with the sinusoidal shape of the bottom member of the hanging device in another embodiment. In a crowded closet, however, there is often no room to slide the adjacent hangers back to create a volume of space to properly view the items. In such a condition, the opening of a holding ring would require removal of the whole assembly from the closet to properly survey the available items, select the desired one and manipulate the ring closures to release the belt. Deliberately maintaining such space for viewing and removal defeats the space savings generated by use of a narrow hanger with a plurality of items organized perpendicular to the closet rod.

U.S. Pat. No. 4,709,838 [1987—Campbell] recognizes the advantages of a vertical orientation as the base for storing clothing accessories which are linear in nature. It also employs as others have, a hook on a swivel for visibility. The problem mentioned in U.S. Pat. No. 5,642,817 (" . . . depending on the depth of the hook, only a fixed number of belts may be supported. Further, it is highly probable that a belt frame may be accidentally forced from the hook thereby allowing the belt to fall to the floor. Finally if a plurality of belts are hung from a single hook, the user must remove all of the belts between the end of the hook and the desired belt in order to gain access to the desired belt") exists with U.S. Pat. No. 4,709,838.

Others have designed devices which require screws or bolts to be installed on closet doors, walls or shelves to overcome the problems mentioned above. U.S. Des. 334,291 [1993—Rooke] is an example where the combined tie and belt rack is screwed into a supporting member. Consumers in general are reluctant to purchase items requiring time and skill to measure, drill and install hardware.

U.S. Pat. No. 6,206,209 B1 [2001—Houg-Brown] claims to improve the issues of visibility, selection, and dislodgement. The mechanism employed for article attachment is a cantilevered hanging surface fitted with a two way spring latch to secure the item from dislodgement. This attachment mechanism is fundamentally different from the present invention.

U.S. Pat. No. 6,076,714 [2000—Wyenn] makes use of Bungee Cord for hanging hockey gear for air drying. U.S. Pat. No. 7,040,517 [2006—Swanson] makes use of cord for supporting hats off a support rod. Both of these designs make use of flexible cord under tension when suspending articles. They do not draw the items to a surface but hang uncontrolled. These designs require open space not typically found in a residential home closet. Both designs would be problematic for storage in a crowded clothes closet when adjacent to other clothing items. Entanglement, visibility issues and overall unacceptable aesthetics are some of the issues with these designs for a residential closet.

Thus, there is a need to produce a storage device for linear items with a buckle prong, buckle frame, or a closed holding loop which is based on a retractable holding mechanism. This invention fulfills such need.

It offers storage in a space efficient way when a plurality of items attached is hung. In addition it allows easy organizing and viewing of the items stored (even in a crowded space) and securely attaches the items stored to the holder. Furthermore, it allows individual retrieval of items without requiring removal of the whole device and offers the option of securely attaching the storage device hook to the support member of the receiving space. Much of the prior art relied on gravity to hold the item off a cantilevered peg, pin or lever to hold the item. This invention makes use of the tension force inherent in a stretchable cord, or a cord, filament thread or wire attached to a spring reel mechanism or a similar device. This would provide a retraction force when anchored inside the hollow body, to retract an eyelet to pin a buckle prong and buckle frame against the storage device's external surface. In the case of other linear items to be stored, a closeable loop (e.g. a carabiner spring hook or wire gate) on the end of the retractable line is used to attach to a hanging loop, fabric loop, ring, hole or open frame on the item and secure it against the storage device's external surface. To accomplish this, one end of the cord is attached to an anchor position inside a cylindrical, spherical, or oval hollow body or any practically shaped polyhedron or polytope shape. The cord, filament thread or wire then passes through a hole in the surface of the hollow body. The other end is attached to an eyelet or to a loop or hook which may be opened and closed for storing items. In the case of apparel belts with buckle frames, the prong can be retained by a permanently closed eyelet and pinned against the device chassis surface. This storage method allows for convenient extraction and retraction of the articles being stored. The cylinder or other shape rotates around a shaft for viewing and storage space efficiency. The shaft is fixed with an attachment hook allowing for suspension from a supporting member and optionally secured to that member.

SUMMARY OF THE INVENTION

This invention provides a method for storage of linear items with buckles or loops that improves space efficiency, minimizing the horizontal rod space consumed. It facilitates the viewing, attachment or retrieval of items stored. It securely attaches these items and allows individual retrieval of these items without requiring removal of the holding device. Lastly it offers the option of securely attaching the storage device hook to the support member of the receiving space. The major elements of the design are:

1) a hook allowing suspension of the complete assembly from a support member
2) a fit hole or ball bearing assembly for the hook shaft to pass through
3) a hollow body chassis with a top cover attached to the ball bearing assembly to allow rotation of the chassis
4) internal anchoring posts
5) stretchable cord or miniature enclosed spring reels (also known as arbor reels) with cord/filament or wire or a similar device which would provide a retraction force when anchored inside the hollow body
6) drilled or punched holes with beveled edges for the cord/wire to pass through
7) attachment mechanisms on the external end of the cord/filament or wire for the item to be stored and held to the external surface of the chassis and
8) a bottom cover to close off the device after the retraction cord or reels are anchored internal to the device.

The device consists of a three dimensional hollow shape attached to a hanging hook. The hook allows the hollow shape to suspend from a typical closet hanging bar and may have further capability of latching to that bar such that the hook will not accidently liftoff said bar. The hollow shape acts as a chassis so that internal to the cavity of the shape, attachment mechanisms (eye holes for anchoring stretchable cord, spring reel mechanisms etc.) can be mounted. Stretchable cord with an acceptable stretch to relax ratio can be mounted internally to a series of eye hole hooks, pulleys or rollers sufficient to obtain an acceptable extraction distance. If bendable wire or non-stretchable fiber/cord are used, then the stretch/retraction is obtained using spring reel devices or similarly capable devices, mounted internal to the cavity of the chassis. The cord, wire or fiber passes through holes on the surface of the shape and attaches to a latch hook from which a belt prong and buckle frame may be attached. A fastener may also be used to hold a loop on the item stored. When the cord, wire or fiber is not extracted by the user, it retracts to the surface of the chassis firmly holding the weight of the attached article. A hook is attached to the top of the chassis in a manner that allows the chassis to rotate freely when turned by hand.

DESCRIPTION OF THE DRAWING VIEWS

Figure 4:
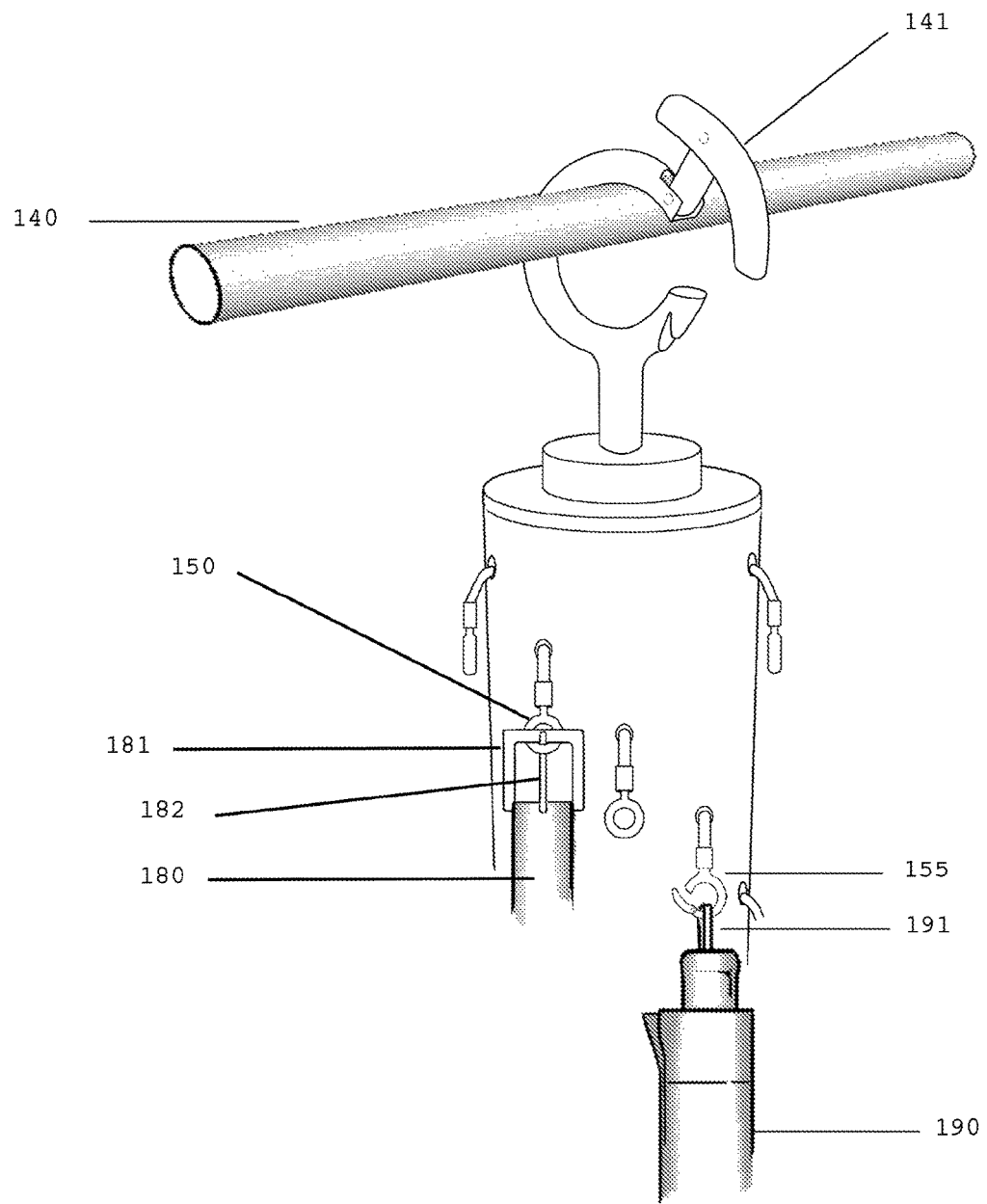

FIG. 4 is a perspective view of the storage device in one embodiment storing an umbrella as an example of a linear shape with a hanging loop as an attachment point, being held against the external surface of a hollow three dimensional shape by employing the tension force of either a stretchable cord, a spring reel or a similar device which would provide a retraction force when anchored on one end inside the hollow body. The closeable loop is shown open for illustrative purposes. Also shown at the top of the drawing is an optional latch hook for secure attachment of the device to a support member.

FIG. 5 is a perspective view with blowup detail (FIG. 6) for an eyelet storage item attachment mechanism FIG. 6 shows an example of a loop capable of receiving the prong of a belt buckle assembly FIGS. 7-9 show detail as examples of other possible storage item attachment mechanisms which provide appropriate attachment for various items depending on the item weight, attachment point and design point chosen in the trade off of secure attachment versus the ease and speed of attachment and retrieval.

Figure 10:
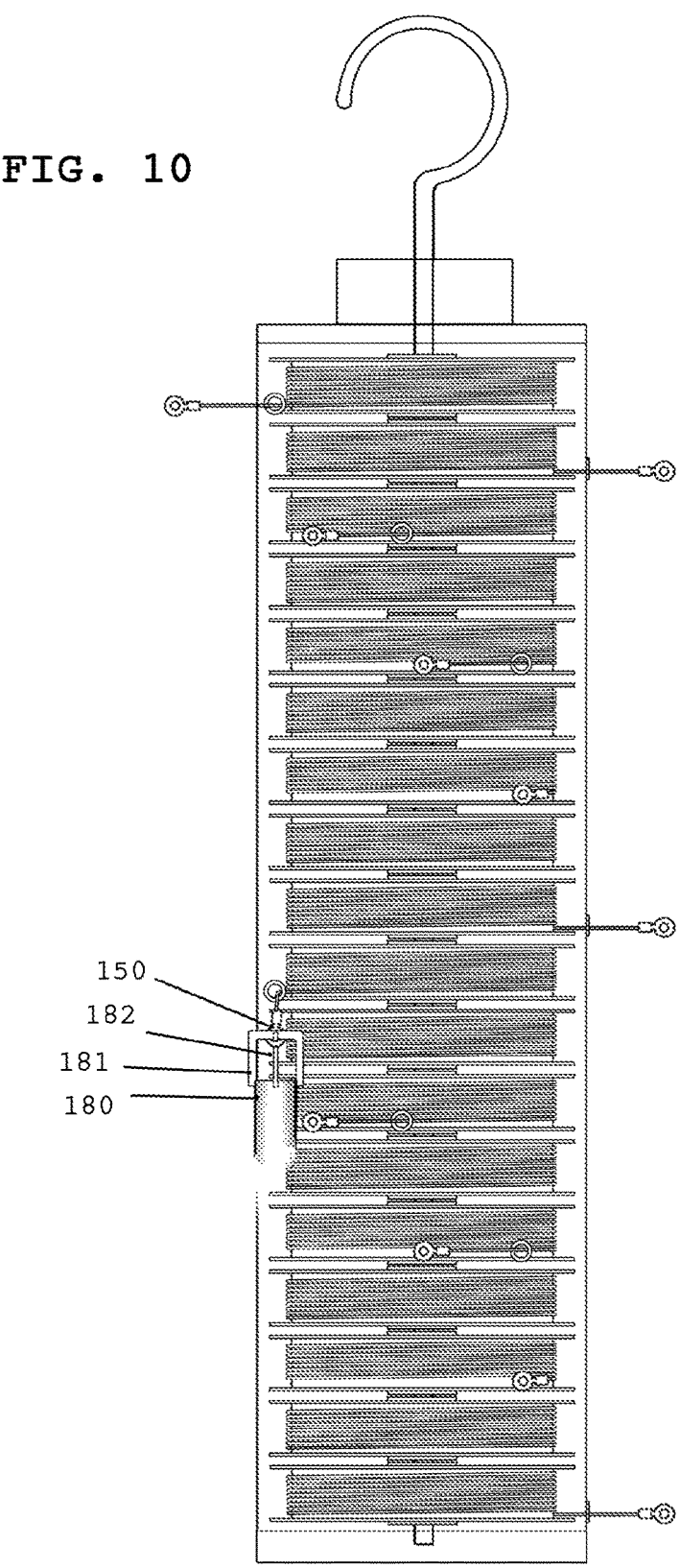

FIG. 10 is a perspective view of an alternative embodiment of the device employing spring reels mounted internal to the hollow body chassis to provide the tension attachment force. For illustrative purposes the view shown is the perspective if the chassis surface was a made of a transparent material.

Figure 11:
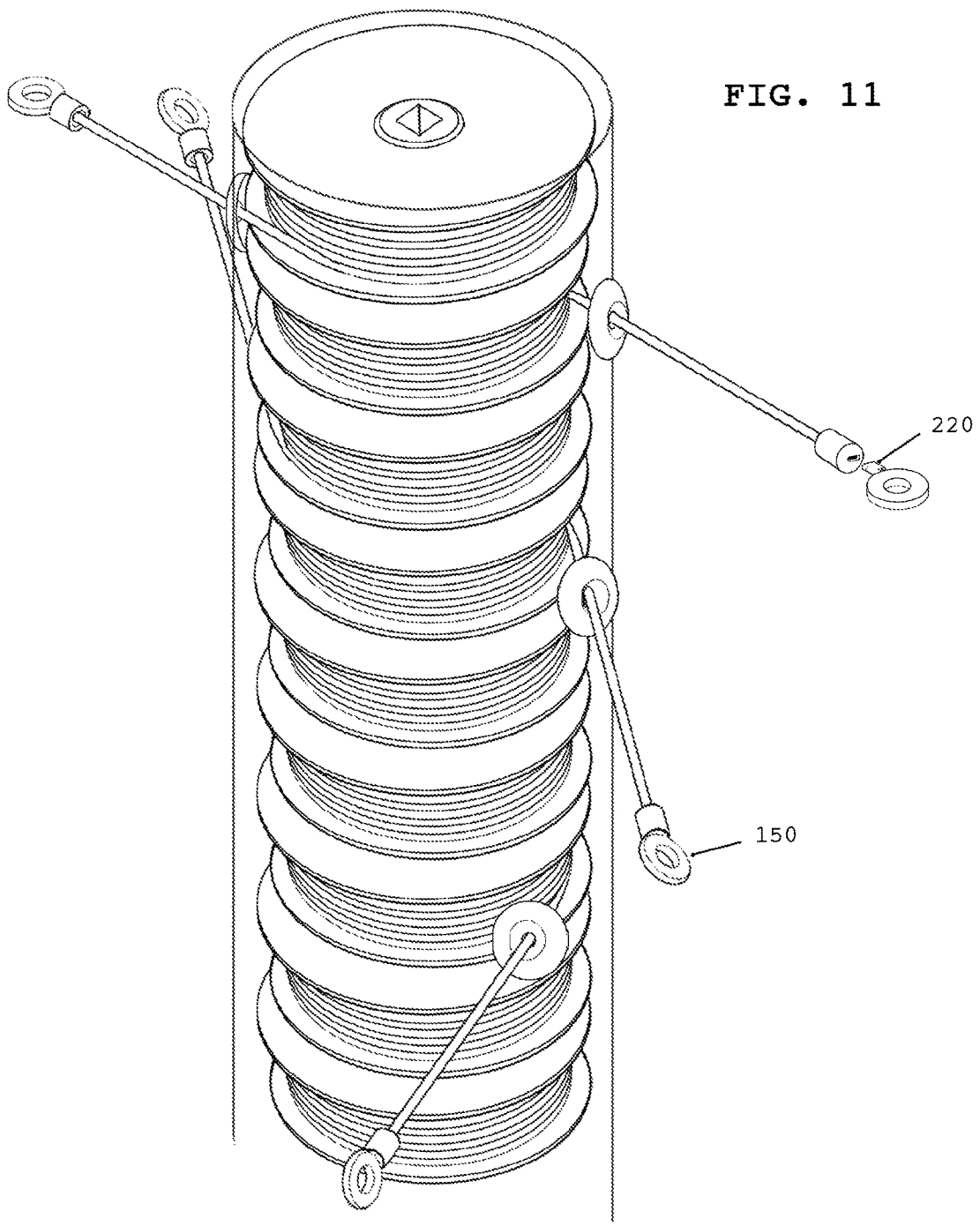

FIG. 11 is a perspective view at larger scale illustrating a permanently attached storage device attachment mechanism and an interchangeable storage device attachment mechanism.

DETAILED DESCRIPTION OF THE INVENTION

Figure 1:
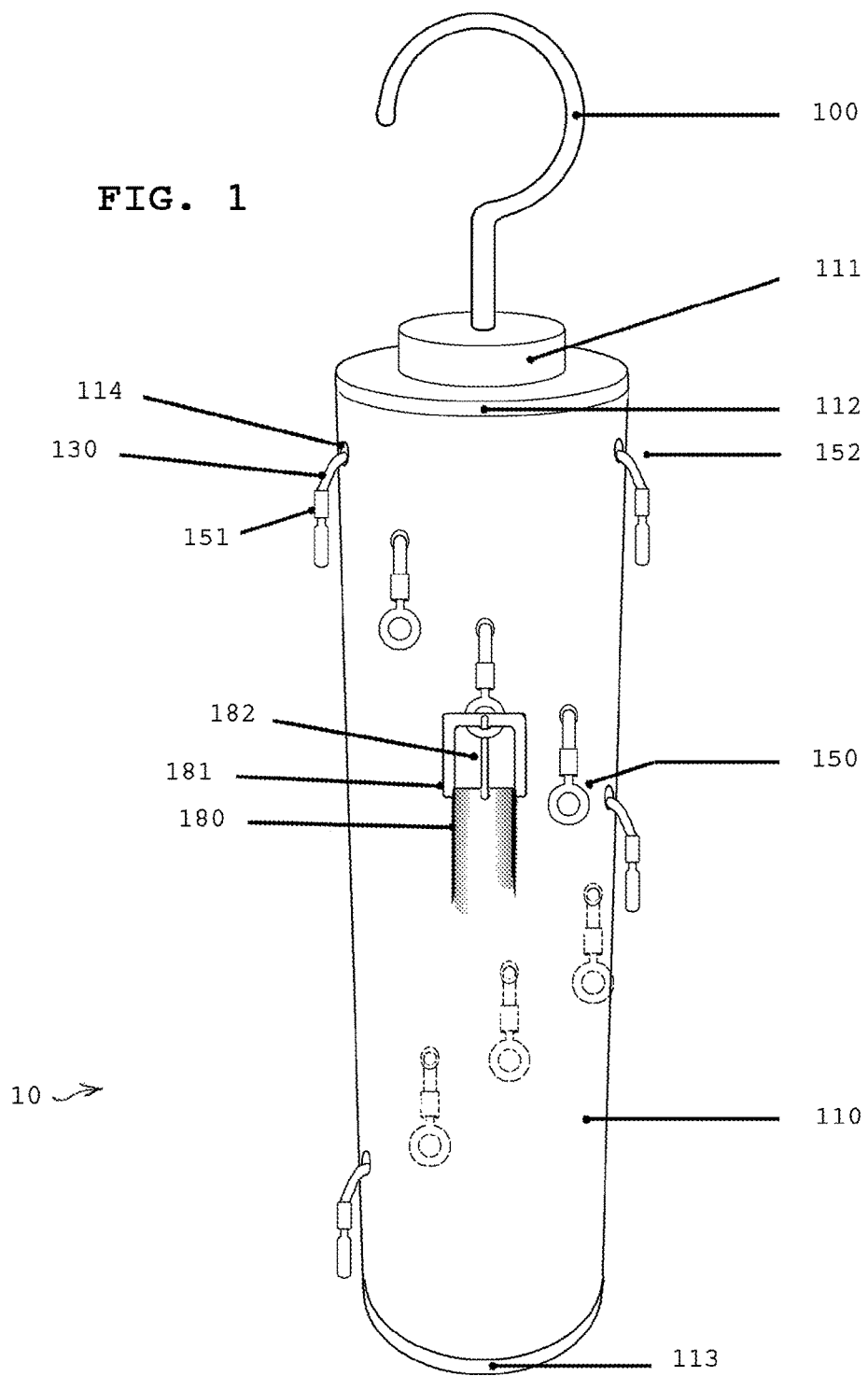
FIG. 1 is a perspective view of the invention depicting a storage device upon which linear items may be stored in one exemplary embodiment of the present invention

FIG. 1 shows a perspective view of the first embodiment of the storage device invention 10. At the top is an open hook 100 which can hang from a typical closet rod or any tightly strung rope, cable or other supporting member. The shaft of the hook passes through a fit hole in the top cover 112 or alternatively through a ball bearing housing 111 to allow the device to rotate around the hook shaft. The ball bearing assemble inside the bearing housing is firmly attached the top cover by a pressure fit into a hole in the top cover 112 or in another manner. This allows the top cover to rotate around the hook shaft. The top cover is attached to the hollow body chassis 110 by screws, bolts or fasteners which pass through holes in a mounting plate welded, glued or molded into the top end of the chassis. The whole assembly is able to rotate around the hook shaft, for visibility and easier access. The chassis 110 is closed off at the end with a bottom cover 113. Anchored inside the chassis are segments of stretchable cord or spring reels or similar devices to provide tension that use fabric cord, filament cord or wire. The other end of the cord 130 passes through beveled holes in the chassis wall 114. These holes spiral down the chassis body, offsetting from the one above, to provide enhanced visibility and access to each item stored on the device. Depending on the length of the chassis there may be a second 152, third or more rows of attachment mechanisms spiraling down the chassis body. The outside end of the cord is attached by press fit or molding 151 to various storage item attachment mechanisms. This attachment may be a fixed design or a two piece snap or lock connector that allows interchanging various designs of attachment mechanisms. FIG. 1 shows an eyelet storage item attachment mechanism 150 which allows a buckle prong to pass through it such that the weight of the belt and tension on the cord will hold it securely against the external wall of the device chassis when fully retracted. FIG. 1 shows one row of storage item attachment mechanisms that start at the upper left side of the hollow body chassis and spiral around the front face. Only the first attachment mechanism of a second row is shown on the upper left side of the chassis 152. The second spiral row would go around the back of the chassis 110 and ending up on the lower right front of the chassis. Depending on the shape of the hollow body the hole geometry would be optimized for the largest amount of storage attachment mechanisms while maintaining visibility and ease of access.

Figure 2:
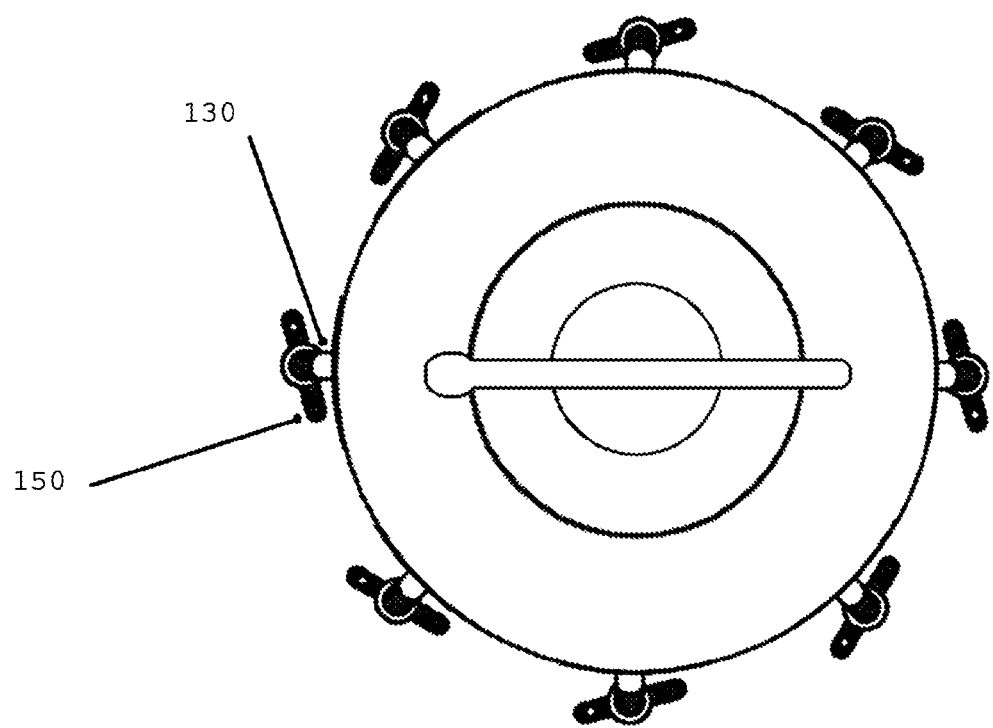
FIG. 2 is a top view of the device showing the first spiral of attachment mechanisms.

FIG. 2 shows a top view with the first row of eyelet storage item attachment mechanisms 150 held against the external wall surface of the chassis by a stretchable cord or wire segment under tension 130

Figure 3:
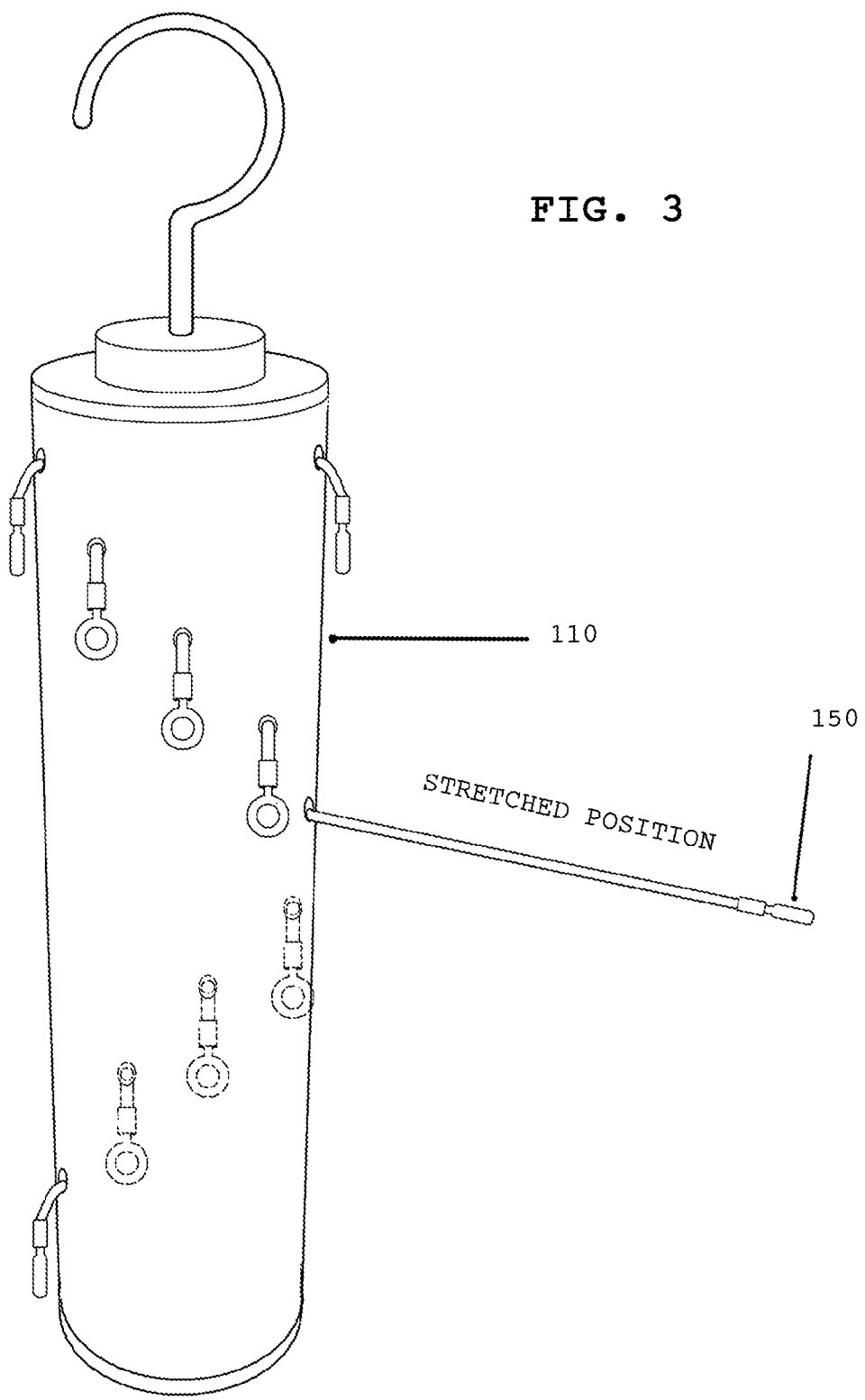
FIG. 3 is a perspective view showing one storage mechanism in an extracted position from the chassis body.

FIG. 3 shows one eyelet storage item attachment mechanism 150 pulled away from the chassis body 110 for item attachment or retrieval FIG. 4 shows a typical fashion belt 180 held against the external surface of a hollow three dimensional shape by employing the tension force of either stretchable cord, a spring reel or a similar device which would provide a retraction force when anchored on one end inside the hollow body. When the eyelet storage item attachment mechanism 150 is brought through the buckle frame 181 towards the belt prong and the belt prong 182 is then inserted inside the eyelet storage item attachment mechanism 150 toward the buckle frame, the gravitational force on the belt and the retraction force of the device cord pulling the belt to the surface of the device, pins the buckle frame 181 between the prong 182 and the eyelet storage item attachment mechanism 150. The hanging loop 191 of a typical collapsible umbrella 190 is illustrated in this figure as well, using a closeable hinge clip attachment mechanism 155 which is shown in an open state. Both are examples of the flexibility the storage device has for hanging different types of linear shaped items. FIG. 4 also shows the storage device with a modification to the suspension hook by using a latching hanging hook. This alternative allows a standard closet rod 140 (typical 35 mm; 1⅜") or cable to pass inside the hook opening. The opening may then be completely closed by a fastener clip 141 attached to the hook. This clip when it is in its locked position, keeps the device hanging hook from dislodging off a support member. This provides secure attachment of the device to a hanging support member (e.g. a rod 140, rope or cable). The device will hang from the support member with the latch 141 opened or closed.

FIG. 5 shows the storage device 10 configured with all eyelet attachment storage mechanisms 150. They may be permanently attached or attached via a removable snap or locking connector to allow reconfiguration with other types of attachment designs to provide flexibility for the end user. The blow up detail for the eyelet storage item attachment mechanism 150 and alternative attachment mechanisms (155, 160, and 170) are shown in FIGS. 6-9.

FIG. 6 shows detail for an eyelet storage item attachment mechanism 150 which is most suitable for storing items with buckle prongs.

FIG. 7 shows detail for an attachment mechanism using a hinge clip design 155. The hinged arm 157 on the lower end of the open hook has two side walls with a hollow space between. The space is narrower than the width of the upper end of the open hook 156 causing a pressure fit when pressed into the upper section of the hook. This captures the item being stored to prevent accidental removal.

FIG. 8 shows detail for a spring hook attachment mechanism 160 using a flexible joint 162 on the lower end of the hook with pliable material 161 at the end of this arm. The arm attached to the flexible joint can pass by the upper end of the open hook 163 effectively closing the loop like a carabiner to prevent an item placed inside the hook from falling off. It can be conveniently pulled out to reverse the procedure and allow the item to be retrieved.

FIG. 9 shows detail for a fastener clip design 170 to firmly attach an item to prevent dislodgement. The hinged arm 173 has two sides spaced apart which are attached together at one end by a moveable hinge 172 and at the other end with a pin/catch bar 174. The pin drops into the notch 171 at the top of the hook opening allowing a pressure fit closure to occur when the arm is brought down after the pin is in the notch.

FIG. 10 shows an alternative embodiment where the attachment mechanism retraction relies on spring reels to provide the tension to hold the item stored against the surface of the storage device chassis. This drawing displays the view which would be seen if the chassis were made of a transparent material such as clear Plexiglas. The arrangement shown contains several spring reels optimized for the space to provide the maximum number of storage items balanced with visibility and avoidance of entanglement. In this drawing a belt (180) is shown drawn to the surface of the device chassis and held there by virtue of the tension force of the spring reel cable pinning the belt buckle frame (181) between an eyelet storage item attachment mechanism (150) on the end of the cable and the belt prong (182).

FIG. 11 is a blown up view of the top half of the chassis in FIG. 10 with the hook, bearing and top cover removed. This figure illustrates the storage device attachment mechanisms may permanently attached (150) or of a removable design to allow for interchangeable of the connectors. The connectors may be of various types optimized to store other linear articles. A fixed loop, lock on rotation connector (220) is shown.

Although the device described above and shown in the drawings used specific embodiments to illustrate the invention, it is intended that the appended claims would include changes, modifications and variations as may be reasonably included within the scope of the present invention, excluding anything limited by prior art.

What is claimed is:

1. A storage device for removably storing linear shaped clothing accessories, said storage device comprising:
   a hollow body having a long axis that extends in a lengthwise direction;
   a mounting means for removably securing the hollow body to a mounting structure, said mounting means including a moving assembly that is coupled to an end of the hollow body so the hollow body can rotate about the long axis;
   wherein the hollow body further includes an external surface and a plurality of through apertures that are disposed about the periphery of the external surface and are arranged so as to extend from the external surface to an interior of the hollow body;
   a plurality of means for tensioning the linear shaped clothing accessory, one for each of the plurality of through apertures, each of said means for tensioning being arranged so a portion thereof movably passes through a respective through aperture;
   wherein one end of each of said means for tensioning is configured and arranged so as to be removably coupled to the linear shaped clothing accessory;
   wherein another portion of the means for tensioning is arranged so as to be coupled to the hollow body;
   wherein said one end is further configured and arranged so as to be larger in at least one dimension than the respective through aperture so said one end does not pass through the respective through aperture and so that the linear shaped clothing accessory attached thereto is drawn towards the hollow body exterior surface by the means for tensioning; and
   wherein the long axis of the hollow body when coupled to the mounting means is arranged so as to be generally parallel to a line of gravity when the mounting means is coupled to the mounting structure.

2. The storage device of claim 1, wherein the plurality of through apertures are further arranged so as to be also disposed in the lengthwise direction and downwardly in a direction of gravity.

3. The storage device of claim 1, wherein the plurality of through apertures are arranged so as to extend downwardly and spiraling about the periphery in the lengthwise direction and in a direction of gravity.

4. The storage device of claim 1, wherein each of the plurality of means for tensioning includes one of a stretchable cord or a spring reel having one of a cord, filament, thread or wire and wherein a portion of the stretchable cord or the spring reel is coupled to the hollow body such that the stretchable cord, cord, filament, thread or wire movably passes through the respective through aperture.

5. The storage device of claim 4, wherein each of the plurality of means for tensioning further includes an accessory attachment mechanism secured to one end of the stretchable cord, cord, filament, thread or wire, the accessory attachment mechanism being larger in at least one dimension than the respective through aperture so the attachment mechanism and the clothing accessory do not pass through the respective through aperture.

6. The storage device of claim 4, wherein said stretchable cord or the spring reel is configured and arranged such that when a user applies a force to said one end of the stretchable cord or to said one end of the cord, filament, thread or wire of the spring reel, said force causes said one end to move outwardly away from the external surface and when said force is removed, gravity and the restoring force of the stretchable cord or the spring reel causes said one end to be drawn back to the external surface.

7. The storage device of claim 1, wherein each of the plurality of means for tensioning further includes an accessory attachment mechanism that is disposed at said one end, the accessory attachment mechanism including one of an eyelet, clasp, wire gate, a fixed loop, lock on rotation connector, a hinge clip, a spring hook, a fastener clip, or a carabiner.

8. The storage device of claim 1, wherein the mounting means is configured and arranged so the hollow body external surface in the lengthwise direction is generally parallel to the line of gravity when the hollow body is secured to the mounting structure.

9. The storage device of claim 1, wherein the mounting means further includes a first member that is configured and arranged so as to engage the mounting structure, wherein the moving assembly is coupled to the first member and the hollow body.

10. The storage device of claim 9, wherein the first member includes a hook shaped portion for removably engaging the mounting structure.

11. The storage device of claim 1, wherein the linear shaped clothing accessory comprises one of apparel belts, or linear items having a holding element including rings, buckles, fabric loops or holes.

12. The storage device of claim 1, wherein the mounting means includes a long axis, and wherein the long axes of the hollow body and the mounting means are generally coaxial when the hollow body is coupled to the mounting means.

13. The storage device of claim 1, wherein the mounting means includes a long axis and wherein the long axes of the hollow body and the mounting means are arranged so as to be generally parallel to a line of gravity when the mounting means is coupled to the mounting structure.

14. The storage device of claim 1, wherein the mounting means includes a long axis and wherein the long axes of the hollow body and the mounting means are arranged so as to be not generally perpendicular to a line of gravity when the mounting means is coupled to the mounting structure.

15. The storage device of claim 5, wherein the accessory attachment mechanism includes an eyelet secured to said one end of the stretchable cord, cord, filament, thread or wire, wherein the linear shaped clothing accessories is belt including a buckle and tongue and wherein said one end is slipped through the buckle and the tongue of the belt is inserted into the eyelet when removably securing the belt to the means for tensioning.

* * * * *